US012567015B2

(12) United States Patent
Sakurai et al.

(10) Patent No.: US 12,567,015 B2
(45) Date of Patent: Mar. 3, 2026

(54) SIMULATION SYSTEM

(71) Applicant: TOYOTA JIDOSHA KABUSHIKI KAISHA, Aichi-ken (JP)

(72) Inventors: Takahiro Sakurai, Nagoya (JP); Shigefumi Tokuda, Susono (JP); Kensuke Matsumoto, Nagoya (JP); Masafumi Kadoi, Chita (JP); Yoshio Takizawa, Tokyo-to (JP); Takumi Ban, Tokyo-to (JP); Ambi Sho, Nisshin (JP); Tomoyuki Kaga, Mishima (JP); Hideo Hasegawa, Nagoya (JP); Kenta Miyahara, Tokyo-to (JP); Shinsuke Yamauchi, Toyata (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 4 days.

(21) Appl. No.: 18/738,067

(22) Filed: Jun. 10, 2024

(65) Prior Publication Data

US 2024/0412137 A1 Dec. 12, 2024

(30) Foreign Application Priority Data

Jun. 12, 2023 (JP) ................................. 2023-096273

(51) Int. Cl.
*G06Q 10/00* (2023.01)
*G06Q 10/0633* (2023.01)
(52) U.S. Cl.
CPC ................................. *G06Q 10/0633* (2013.01)
(58) Field of Classification Search
CPC .......................................... G06Q 10/00–50/00

USPC .......................................................... 705/7.27
See application file for complete search history.

(56) References Cited

U.S. PATENT DOCUMENTS

| | | | | |
|---|---|---|---|---|
| 10,614,391 | B2 * | 4/2020 | Imazawa .............. | G06V 10/764 |
| 11,556,879 | B1 * | 1/2023 | Timmons ......... | G06Q 10/06398 |
| 2020/0042921 | A1 * | 2/2020 | Itou ........................ | G06Q 10/06 |
| 2020/0265535 | A1 | 8/2020 | Okada et al. | |
| 2022/0321507 | A1 * | 10/2022 | Skuratowicz ......... | G06F 3/0481 |
| 2024/0311730 | A1 * | 9/2024 | Carroll .............. | G06Q 10/0635 |
| 2025/0191482 | A1 * | 6/2025 | Nonaka ................... | G06F 3/017 |

FOREIGN PATENT DOCUMENTS

| | | |
|---|---|---|
| JP | 2020-144233 A | 9/2020 |
| JP | 2021-015507 A | 2/2021 |
| WO | 2019/093386 A1 | 5/2019 |

* cited by examiner

*Primary Examiner* — Mustafa Iqbal
(74) *Attorney, Agent, or Firm* — HAUPTMAN HAM, LLP

(57) ABSTRACT

A work line includes: a first work carried out by a first target worker; and a second work carried out by a second target worker on a resultant product of the first work. A first model motion is a model motion when the first target worker passes the resultant product of the first work to the second target worker. A second model motion is a model motion when the second target worker receives the resultant product of the first work from the first target worker. When the first target worker carries out the first work in a virtual space, a simulation system draws a first model worker performing the first model motion in the virtual space. When the second target worker carries out the second work in the virtual space, the simulation system draws a second model worker performing the second model motion in the virtual space.

3 Claims, 5 Drawing Sheets

SIMULATION SYSTEM

CROSS-REFERENCES TO RELATED APPLICATION

The present disclosure claims priority to Japanese Patent Application No. 2023-096273, filed on Jun. 12, 2023, the contents of which application are incorporated herein by reference in their entirety.

TECHNICAL FIELD

The present disclosure relates to a technique for simulating a work line in a virtual space.

BACKGROUND ART

Patent Literature 1 discloses a learning support system. The learning support system displays a model moving image of an instructor serving as a model of a motion of a learner by superimposing the model moving image on a video in a visual field of the learner. Basic information of the learner includes an age, a dominant hand, acuity of vision, grip strength, and the like of the learner. The learning support system changes the display contents of the model moving image according to the basic information of the learner.

LIST OF RELATED ART

Patent Literature 1: Japanese Laid-Open Patent Application No. JP-2020-144233

SUMMARY

There may be a cooperation between successive works in a work line. An object of the present disclosure is to provide a technique that enables effective learning of a cooperation between successive works.

An aspect of the present disclosure is directed to a simulation system for simulating a work line in a virtual space.

The work line includes: a first work carried out by a first target worker; and a second work carried out by a second target worker on a resultant product (object) of the first work.

A first model motion includes a motion serving as a model when the first target worker passes the resultant product of the first work to the second target worker.

A second model motion includes a motion serving as a model when the second target worker receives the resultant product of the first work from the first target worker.

The simulation system includes one or more processors.

The one or more processors determine a combination of the first model motion and the second model motion.

When the first target worker performs a motion related to the first work in the virtual space, the one or more processors draw a first model worker performing the first model motion in the virtual space.

When the second target worker performs a motion related to the second work in the virtual space, the one or more processors draw a second model worker performing the second model motion in the virtual space.

According to the present disclosure, the first model worker performing the first model motion and the second model worker performing the second model motion are drawn in the virtual space. The first model motion includes a motion serving as a model when the first target worker passes the resultant product of the first work to the second target worker. The second model motion includes a motion serving as a model when the second target worker receives the resultant product of the first work from the first target worker. Thus, the first target worker and the second target worker are able to effectively learn an efficient cooperation between the first work and the second work.

DETAILED DESCRIPTION

1. Overview of Simulation System

A predetermined work carried out by a worker in a real space is considered. For example, the predetermined work is carried out in an real factory. The predetermined work is, for example, assembly of components. According to the present embodiment, simulation is utilized for efficiently training a worker who is supposed to do the predetermined work.

Figure 1:
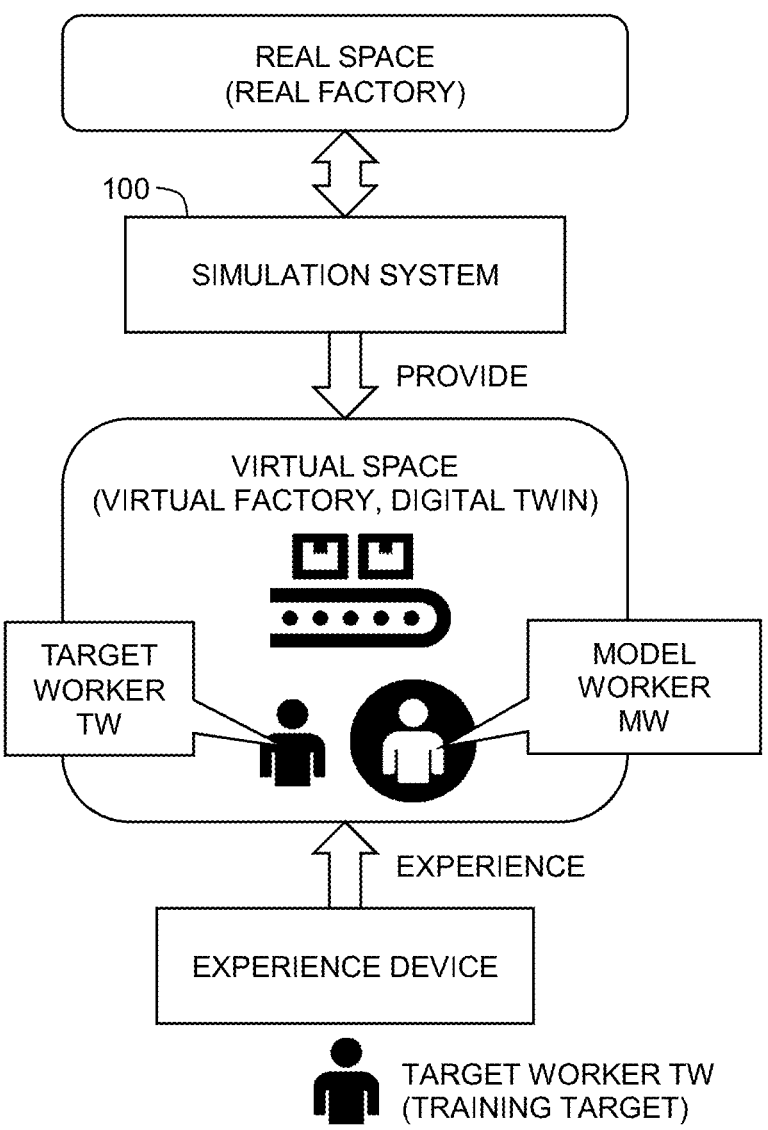
FIG. 1 is a conceptual diagram for explaining an overview of a simulation system according to an embodiment.

FIG. 1 is a conceptual diagram for explaining an overview of a simulation system 100 according to the present embodiment. The simulation system 100 performs, in a virtual space, a simulation of the predetermined work carried out by a worker. For this purpose, the simulation system 100 virtually reproduces, in the virtual space, a work environment in which the worker carries out the predetermined work. For example, the simulation system 100 reproduces (renders) the work environment in the virtual space based on the DigitalTwin technology. For example, the simulation system 100 reproduces a virtual factory (DigitalTwin plant) simulating a real factory in the virtual space.

A worker being a training target (hereinafter referred to as a "target worker TW") is able to experience the predetermined work in the virtual space by using an experience device. For example, the experience device is a wearable device such as a head mounted display (HMD) or the like. The head mounted display displays the virtual space reproduced by the simulation system 100. A motion (e.g., a motion of a hand) of the target worker TW in the real space is recognized by a motion capture technology. For example, the motion of the target worker TW is recognized by imaging the target worker TW with a camera. As another example, an inertial sensor (e.g., a gyro sensor, an acceleration sensor, or the like) may be attached to a body of the target worker TW, and the motion of the target worker TW may be recognized based on a result of detection by the inertial sensor. The simulation system 100 draws and superimposes the recognized motion of the target worker TW on the virtual space. For example, the simulation system 100 draws and superimposes the recognized motion of the hand of the target worker TW on the virtual space. As a result, the target worker TW is able to feel as if he or she is doing the predetermined work in the virtual space. That is, the target worker TW is able to experience the predetermined work in the virtual space.

In addition, the simulation system 100 may draw and superimpose a virtual model worker MW performing a model motion on the virtual space. The model motion is a motion serving as a model when the target worker TW carries out the predetermined work. In the virtual space, the virtual model worker MW performs the model motion. The model worker MW may also be referred to as a "ghost worker." In the virtual space, the target worker TW carries out the predetermined work by imitating the model motion performed by the model worker MW. This enables efficient and effective training.

Figure 2:
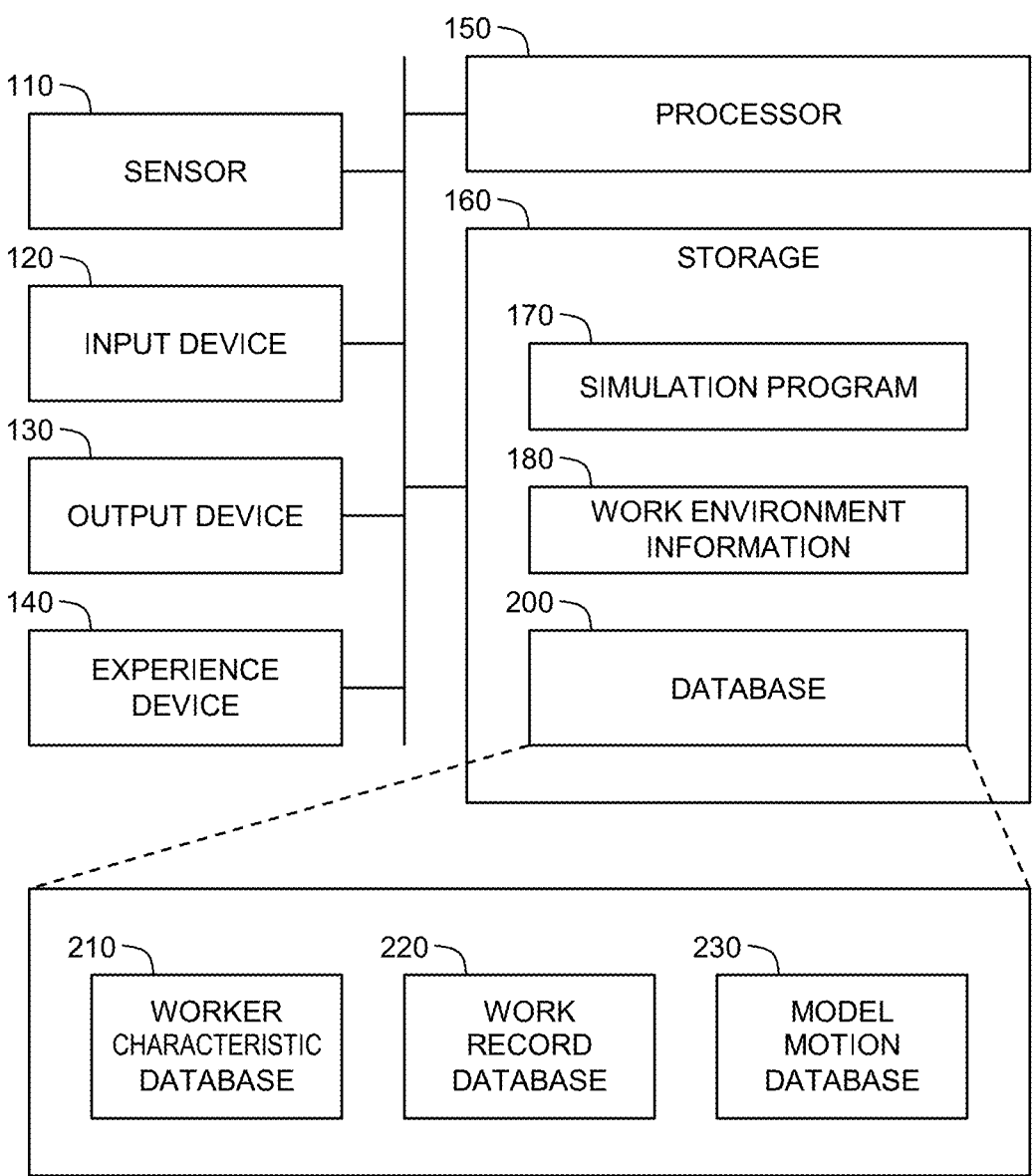
FIG. 2 is a block diagram showing an example of a configuration of a simulation system according to an embodiment.

FIG. 2 is a block diagram showing an example of a configuration of the simulation system 100 according to the present embodiment. The simulation system 100 includes a sensor 110, an input device 120, an output device 130, and an experience device 140.

The sensor 110 is set in the real space and detects a variety of information. For example, the sensor 110 detects a motion of a worker in the real space. Examples of the sensor 110 that detects the motion of the worker include a camera, an infrared sensor, an inertial sensor, and the like. For example, the motion of the worker can be detected by capturing an image of the worker with a camera. As another example, the inertial sensor (e.g., a gyro sensor, an acceleration sensor, or the like) may be attached to a body of the worker, and the motion of the worker may be detected by the inertial sensor.

As another example, the sensor 110 may detect a physical characteristic of the worker in the real space. Examples of the physical characteristic include a dominant hand, a hand size, grip strength, a height, a muscle mass, acuity of vision, and the like. For example, the dominant hand of the worker is detected based on the motion of the worker captured by the camera. As another example, the hand size, the height, and the like are detected based on the image of the worker captured by the camera. In addition, the sensor 110 may include a height meter, a weight meter, a body composition meter, a grip strength meter, a vision analyzer, and the like.

As still another example, the sensor 110 may include a biometric sensor that detects biometric information of the worker in the real space. Examples of the biometric information include a body temperature, a heart rate, a level of fatigue, a level of stress, and the like.

Examples of the input device 120 include a touch panel, a keyboard, a mouse, a microphone, and the like. Examples of the output device 130 include a display, a touch panel, a speaker, and the like.

The experience device 140 is used by the target worker TW being the training target for experiencing a work environment and the predetermined work in the virtual space. For example, the experience device 140 is a wearable device such as a head mounted display (HMD) and the like. The head mounted display displays the virtual space reproduced by the simulation system 100.

The simulation system 100 further includes one or more processors 150 (hereinafter simply referred to as a "processor 150" or "processing circuitry") and one or more storages 160 (hereinafter simply referred to as a "storage 160"). The processor 150 executes a variety of processing. Examples of the processor 150 include a central processing unit (CPU), a graphics processing unit (GPU), an application specific integrated circuit (ASIC), a field-programmable gate array (FPGA), and the like. The storage 160 stores a variety of information. Examples of the storage 160 include a hard disk drive (HDD), a solid state drive (SSD), a volatile memory, a non-volatile memory, and the like.

A simulation program 170 is a computer program for performing the above-described simulation in the virtual space, and is executed by the processor 150. A variety of processing by the simulation system 100 may be implemented by a cooperation of the processor 150 executing the simulation program 170 and the storage 160. The simulation program 170 is stored in the storage 160. The simulation program 170 may be recorded on a non-transitory computer-readable recording medium.

Work environment information 180 is information of a work environment (for example, a real factory) reproduced in the virtual space. For example, the work environment information 180 indicates a three-dimensional configuration of structures (e.g., lines, machines, walls, columns, and the like) in the work environment. For example, the three-dimensional configuration of the structures is expressed by CAD data. The work environment information 180 is stored in the storage 160.

The storage 160 further stores a database 200. The database 200 includes a worker characteristic database 210, a work record database 220, and a model motion database 230.

The worker characteristic database 210 is a database indicating the physical characteristic for each worker. Examples of the physical characteristic include a dominant hand, a hand size, grip strength, a height, a muscle mass, acuity of vision, and the like. For example, the physical characteristic of each worker is detected by the sensor 110 described above. As another example, each worker may input his or her physical characteristic by the use of the input device 120. The physical characteristic represented by numerical values such as the height may be grouped into several groups for each predetermined range.

The work record database 220 is a database indicating past records of the predetermined work that have been carried out by a variety of workers. For example, the work record database 220 includes a video of a worker who is doing the predetermined work. The video of the worker is taken by the camera included in the sensor 110. As another example, the work record database 220 may indicate a content of a motion performed a worker during the predetermined work. As still another example, the work record database 220 may indicate a time required for a worker to complete the predetermined work. Such the work record database 220 is generated based on the motion of the worker detected by the sensor 110.

The model motion database 230 is a database related to the model motion that serves as a model when the target worker TW carries out the predetermined work. The model motion regarding the predetermined work may be generated in advance based on the work record database 220.

The processor 150 reproduces the work environment in which the worker carries out the predetermined work in the virtual space based on the work environment information 180. For example, the processor 150 reproduces (renders) the work environment in the virtual space based on the DigitalTwin technology.

Moreover, the processor 150 uses the sensor 110 to recognize the motion of the target worker TW being the training target. The motion of the target worker TW in the real space is recognized by using the motion capture technology. For example, the motion of the target worker TW is recognized by imaging the target worker TW with the camera. As another example, the inertial sensor may be attached to the body of the target worker TW, and the motion of the target worker TW may be recognized based on a result of detection by the inertial sensor. The processor 150 draws and superimposes the recognized motion of the target worker TW on the virtual space. For example, the processor 150 draws and superimposes the recognized motion of the hand of the target worker TW on the virtual space. Through the experience device 140, the target worker TW is able to feel as if he or she is doing the predetermined work in the virtual space. That is, the target worker TW is able to experience the predetermined work in the virtual space through the experience device 140.

Furthermore, the processor 150 determines, based on the model motion database 230, the model motion that serves as a model when the target worker TW carries out the predetermined work. Then, the processor 150 draws and superimposes the virtual model worker MW performing the model motion in the virtual space. In the virtual space, the target worker TW carries out the predetermined work by imitating the model motion performed by the model worker MW. This enables efficient and effective training.

2. Simulation of Work Line 2-1. Overview

Figure 3:
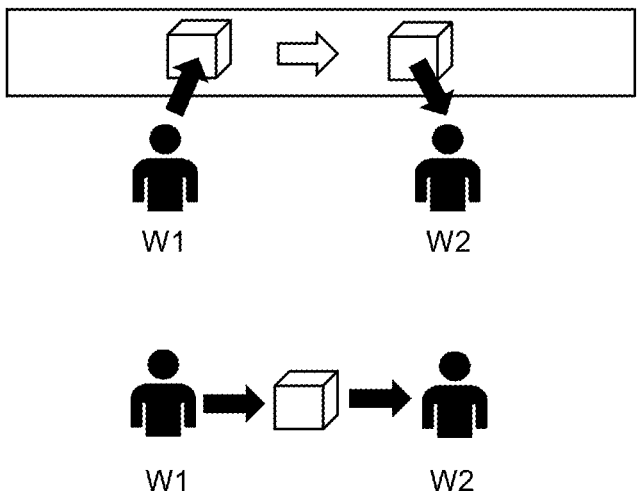
FIG. 3 is a conceptual diagram for explaining a cooperation between successive (a sequence of) works a work line.

Next, a cooperation between successive (a sequence of) works in a work line will be considered. FIG. 3 is a conceptual diagram for explaining a cooperation between successive works in a work line. The work line includes a first work on the upstream side and a second work on the downstream side. A first worker W1 carries out the first work on the upstream side. For example, the first worker W1 assembles a certain component. The first worker W1 passes a resultant product (resultant object) (for example, an assembled component) of the first work to the second worker W2 on the downstream side. The first worker W1 may directly pass the resultant product or may indirectly pass the resultant product via a belt conveyor or the like. A second worker W2 on the downstream side receives the resultant product of the first work from the first worker W1. The second worker W2 may directly receive the resultant product or may indirectly receive the resultant product via a belt conveyor or the like. Then, the second worker W2 carries out the second work on the downstream side on the received resultant product of the first work.

Figure 4:
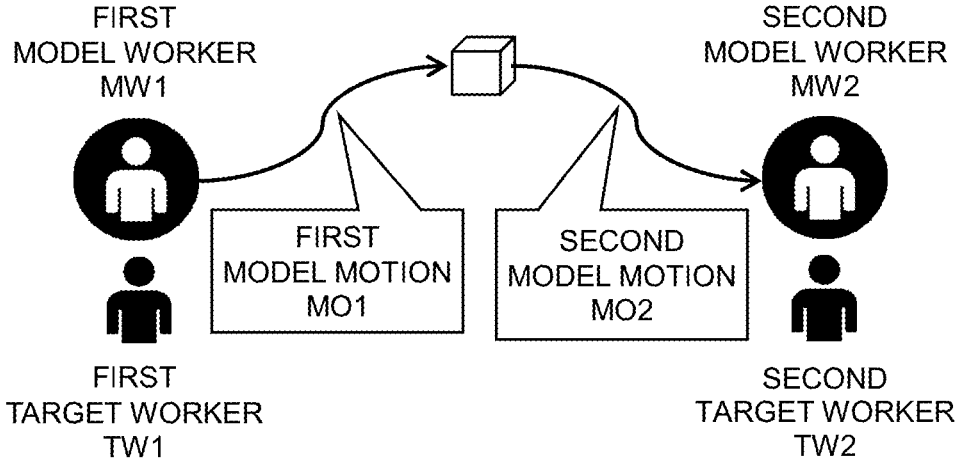
FIG. 4 is a conceptual diagram for explaining a simulation of the work line according to an embodiment.

It is desirable to effectively learn such the cooperation between the first work and the second work. In the following description, the first worker W1 being a training target is referred to as a "first target worker TW1," and the second worker W2 being a training target is referred to as a "second target worker TW2." FIG. 4 is a conceptual diagram for explaining a simulation of the work line according to the present embodiment. The simulation system 100 simulates the work line in the virtual space.

A "first model motion MO1" is a model motion related to the first work. The first model motion includes a motion that serves as a model when the first target worker TW1 passes the resultant product of the first work to the second target worker TW2. The first model motion may further include a motion that serves as a model when the first target worker TW1 carries out the first work.

On the other hand, a "second model motion MO2" is a model motion related to the second work. The second model motion includes a motion that serves as a model when the second target worker TW2 receives the resultant product of the first work from the first target worker TW1. The second model motion may further include a motion that serves as a model when the second target worker TW2 carries out the second work.

The simulation system 100 determines a combination of the first model motion MO1 and the second model motion MO2. Typically, the simulation system 100 determines a combination of the first model motion MO1 and the second model motion MO2 so as to satisfy a predetermined condition. Various examples of a method for determining the first model motion MO1 and the second model motion MO2 will be described later. The combination of the first model motion MO1 and the second model motion MO2 with respect to the combination of the first work and the second work is registered in the model motion database 230.

A first model worker MW1 is the model worker MW performing the first model motion MO1. A second model worker MW2 is the model worker MW performing the second model motion MO2. The simulation system 100 draws the first model worker MW1 and the second model worker MW2 in the virtual space based on the model motion database 230.

More specifically, when the first target worker TW1 performs a motion related to the first work in the virtual space, the simulation system 100 draws the first model worker MW1 performing the first model motion MO1 in the virtual space. The first target worker TW1 performs the motion related to the first work by imitating the first model motion MO1 performed by the first model worker MW1. When the second target worker TW2 performs a motion related to the second work in the virtual space, the simulation system 100 draws the second model worker MW2 performing the second model motion MO2 in the virtual space. The second target worker TW2 performs the motion related to the second work by imitating the second model motion MO2 performed by the second model worker MW2. Thus, the first target worker TW1 and the second target worker TW2 are able to effectively learn an efficient cooperation between the first work and the second work.

2-2. Example of Method of Determining First Model Motion and Second Model Motion Hereinafter, various examples of a method of determining the first model motion MO1 and the second model motion MO2 will be described. Typically, the combination of the first model motion MO1 and the second model motion MO2 is determined so as to satisfy a "predetermined condition."

2-2-1. First Example

In a first example, the simulation system 100 acquires characteristic information indicating a first characteristic of the first target worker TW1. The first characteristic of the first target worker TW1 includes a physical characteristic (e.g., a dominant hand, a height, and the like) of the first target worker TW1. The physical characteristic of the first target worker TW1 is obtained from the worker characteristic database 210. The simulation system 100 determines the combination of the first model motion MO1 and the second model motion MO2 based on the physical characteristic of the first target worker TW1.

For example, the first model motion MO1 is determined in consideration of the dominant hand of the first target worker TW1 such that the first target worker TW1 is able to easily pass the resultant product of the first work to the second target worker TW2. After the first model motion MO1 is determined, the second model motion MO2 is determined so as to receive the resultant product passed by the first model motion MO1.

As another example, a target position at which the first target worker TW1 can easily place the resultant product of the first work is determined in consideration of the height of the first target worker TW1. The first model motion MO1 is determined so as to place the resultant product of the first work at the target position. After that, the second model motion MO2 is determined so as to take the resultant product of the first work from the target position.

The first characteristic of the first target worker TW1 may include a skill level of the first target worker TW1. The skill level of the first target worker TW1 is estimated based on the work record database 220. For example, the skill level is estimated to be higher as the motion related to the first work is performed more quickly. When the skill level of the first target worker TW1 is low, the first model motion MO1 is determined to be as simple as possible. After the first model motion MO1 is determined, the second model motion MO2 is determined so as to receive the resultant product passed by the first model motion MO1.

When generalized, the predetermined condition in the first example is that "a load on the first target worker TW1 when passing the resultant product of the first work is less than a threshold." The load when passing the resultant product of the first work may be calculated based on a degree of twisting of a body, an operation time, and the like. The loads with respect to a variety of motion patterns are obtained from the work record database 220 or obtained through simulation. The simulation system 100 determines the combination of the first model motion MO1 and the second model motion MO2 based on the first characteristic of the first target worker TW1 such that the load on the first target worker TW1 when passing the resultant product of the first work is less than a threshold. Since the first characteristic of the first target worker TW1 is taken into consideration, it is possible to learn a further efficient cooperation.

2-2-2. Second Example

In a second example, the simulation system 100 acquires characteristic information indicating a second characteristic of the second target worker TW2. The second characteristic of the second target worker TW2 includes a physical characteristic (e.g., a dominant hand, a height, and the like) of the second target worker TW2. The physical characteristic of the second target worker TW2 is obtained from the worker characteristic database 210. The simulation system 100 determines the combination of the first model motion MO1 and the second model motion MO2 based on the physical characteristic of the second target worker TW2.

For example, one of the first model motion MO1 and the second model motion MO2 is determined in consideration of the dominant hand of the second target worker TW2 such that the second target worker TW2 is able to easily receive the resultant product of the first work. After one of the first model motion MO1 and the second model motion MO2 is determined, the other of the first model motion MO1 and the second model motion MO2 is determined.

As another example, a target position from which the second target worker TW2 can easily take the resultant product of the first work is determined in consideration of the height of the second target worker TW2. The first model motion MO1 is determined so as to place the resultant product of the first work at the target position. The second model motion MO2 is determined so as to take the resultant product of the first work from the target position.

The second characteristic of the second target worker TW2 may include a skill level of the second target worker TW2. The skill level of the second target worker TW2 is estimated based on the work record database 220. For example, the skill level is estimated to be higher as the motion related to the second work is performed more quickly. When the skill level of the second target worker TW2 is low, the second model motion MO2 is determined to be as simple as possible. After the second model motion MO2 is determined, the first model motion MO1 is determined in accordance with the second model motion MO2.

When generalized, the predetermined condition in the second example is that "a load on the second target worker TW2 when receiving the resultant product of the first work is less than a threshold." The load when receiving the resultant product of the first work may be calculated based on a degree of twisting of a body, an operation time, and the like. The loads with respect to a variety of motion patterns are obtained from the work record database 220 or obtained through simulation. The simulation system 100 determines the combination of the first model motion MO1 and the second model motion MO2 based on the second characteristic of the second target worker TW2 such that the load on the second target worker TW2 when receiving the resultant product of the first work is less than a threshold. Since the second characteristic of the second target worker TW2 is taken into consideration, it is possible to learn a further efficient cooperation.

2-2-3. Third Example

A combination of the first example and the second example described above is also possible. Since both the first characteristic of the first target worker TW1 and the second characteristic of the second target worker TW2 are taken into consideration, it is possible to learn a further efficient cooperation.

2-2-4. Fourth Example

In a fourth example, the predetermined condition is that "a time required for handing over the resultant product of the first work from the first target worker TW1 to the second target worker TW2 is shorter than a predetermined time." The combination of the first model motion MO1 and the second model motion MO2 that satisfies the predetermined condition may be retrieved from the work record database 220 or may be searched through simulation. The fourth example also enables the efficient learning of the cooperation.

2-2-5. Fifth Example

In a fifth example, at least one of the first model motion MO1 and the second model motion MO2 is set to an actual motion of an experienced worker. Both the first model motion MO1 and the second model motion MO2 may be respectively set to actual motions of experienced workers. The actual motion of the experienced worker is obtained from the work record database 220. According to the fifth example, it is possible to effectively learn an efficient cooperation by the experienced workers.

2-3. Effects

As described above, according to the present embodiment, the first model worker MW1 performing the first model motion MO1 and the second model worker MW2 performing the second model motion MO2 are drawn in the virtual space. The first model motion MO1 includes a motion that serves as a model when the first target worker TW1 passes the resultant product of the first work to the second target worker TW2. The second model motion MO2 includes a motion that serves as a model when the second target worker TW2 receives the resultant product of the first work from the first target worker TW1. Thus, the first target worker TW1 and the second target worker TW2 are able to effectively learn the efficient cooperation between the first work and the second work.

3. Modification Example

Figure 5:
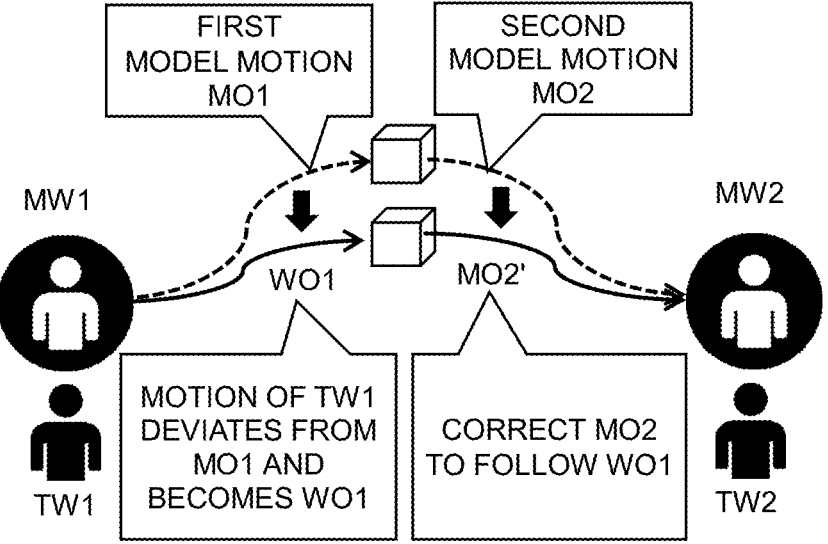
FIG. 5 is a conceptual diagram for explaining a modification example of a simulation of the work line according to an embodiment.

FIG. 5 is a conceptual diagram for explaining a modification example. As described above, the first model motion MO1 and the second model motion MO2 are set in advance. The first target worker TW1 performs a motion related to the first work by imitating the first model motion MO1 performed by the first model worker MW1. However, an actual motion of the first target worker TW1 is not necessarily the same as the first model motion MO1. The actual motion of the first target worker TW1 may deviate from the first model motion MO1. In that case, the second target worker TW2 on the downstream side may not successfully receive the resultant product of the first work with the second model motion set in advance.

In view of the above, in the present modification example, the simulation system 100 dynamically corrects the second model motion MO2 in accordance with a result of the motion performed by the first target worker TW1.

More specifically, a first motion WO1 is the actual motion performed by the first target worker TW1 when passing the resultant product of the first work to the second target worker TW2 in the virtual space. The simulation system 100 acquires information on the first motion WO1 of the first target worker TW1 through the sensor 110. Subsequently, the simulation system 100 compares the first motion WO1 with the first model motion MO1 to calculate a degree of deviation of the first motion WO1 from the first model motion MO1. When the degree of deviation exceeds a threshold value, the simulation system 100 corrects the second model motion MO2 so as to receive the resultant product of the first work passed by the first motion WO1. In other words, the simulation system 100 corrects the second model motion MO2 so as to follow the first motion WO1.

A corrected second model motion MO2' is a result of correcting the second model motion MO2. The simulation system 100 draws the second model worker MW2 performing the corrected second model motion MO2' in the virtual space. The second target worker TW2 performs a motion related to the second work by imitating the corrected second model motion MO2' performed by the second model worker MW2.

As described above, according to the modification example, even when the first motion performed by the first target worker TW1 on the upstream side deviates from the first model motion MO1, it is possible to continue the training of the second target worker TW2 on the downstream side.

What is claimed is:
1. A simulation system for simulating a work line in a virtual space, wherein
the work line includes: a first work carried out by a first target worker; and a second work carried out by a second target worker on a resultant product of the first work,
a first model motion includes a motion serving as a model when the first target worker passes the resultant product of the first work to the second target worker, and a second model motion includes a motion serving as a model when the second target worker receives the resultant product of the first work from the first target worker, the simulation system comprising:
a sensor configured to recognize a motion of the first target worker and a motion of the second target worker in a real space;
processing circuitry configured to:
    acquire characteristic information indicating at least one of a first characteristic of the first target worker and a second characteristic of the second target worker;
    determine a combination of the first model motion and the second model motion based on the at least one of the first characteristic and the second characteristic;
    draw a first model worker performing the first model motion in the virtual space in response to determining the motion of the first target worker, recognized by the sensor, being related to the first work in the virtual space;
    draw a second model worker performing the second model motion in the virtual space in response to determining the motion of the second target worker, recognized by the sensor, being related to the second work in the virtual space; and
    superimpose the motion of the first target worker and the motion of the second target workers, which are recognized by the sensor, on the virtual space; and
a display configured to present, in the virtual space, the motion of the first target worker, the motion of the second target worker, the first model worker and the second model worker, to the first target worker and the second target worker,
wherein
the characteristic information indicates at least the first characteristic of the first target worker, and the processing circuitry is configured to determine the combination of the first model motion and the second model motion based on the first characteristic of the first target worker such that a load on the first target worker when passing the resultant product of the first work is less than a first threshold, or
the characteristic information indicates at least the second characteristic of the second target worker, and the processing circuitry is configured to determine the combination of the first model motion and the second model motion based on the second characteristic of the second target worker such that a load on the second target worker when receiving the resultant product of the first work is less than a second threshold.
2. The simulation system according to claim 1, wherein the processing circuitry is further configured to:
    acquire information on a first motion performed by the first target worker when passing the resultant product of the first work to the second target worker in the virtual space; and
    when a degree of deviation of the first motion from the first model motion exceeds a threshold, correct the second model motion so as to receive the resultant product of the first work passed by the first motion.
3. A simulation system for simulating a work line in a virtual space, wherein
the work line includes: a first work carried out by a first target worker; and a second work carried out by a second target worker on a resultant product of the first work, a first model motion includes a motion serving as a model when the first target worker passes the resultant product of the first work to the second target worker, and a second model motion includes a motion serving as a model when the second target worker receives the resultant product of the first work from the first target worker, the simulation system comprising:

a sensor configured to recognize a motion of the first target worker and a motion of the second target worker in a real space;

processing circuitry configured to:

determine a combination of the first model motion and the second model motion;

draw a first model worker performing the first model motion in the virtual space in response to determining the motion of the first target worker, recognized by the sensor, being related to the first work in the virtual space;

draw a second model worker performing the second model motion in the virtual space in response to determining the motion of the second target worker, recognized by the sensor, being related to the second work in the virtual space; and superimpose the motion of the first target worker and the motion of the second target workers, which are recognized by the sensor, on the virtual space; and a display, wherein the processing circuitry is further configured to:

acquire information on a first motion performed by the first target worker when passing the resultant product of the first work to the second target worker in the virtual space;

in response to a degree of deviation of the first motion from the first model motion exceeding a threshold, correct the second model motion so as to receive the resultant product of the first work passed by the first motion;

draw a corrected second model worker performing the second model motion being corrected; and cause the display to present, in the virtual space, the motion of the first target worker, the motion of the second target worker, the first model worker and the corrected second model worker, to the first target worker and the second target worker.

* * * * *